United States Patent [19]

Amirpanahi

[11] Patent Number: 5,648,906

[45] Date of Patent: Jul. 15, 1997

[54] NETWORKED COMPUTERIZED PARKING SYSTEM OF NETWORKED COMPUTERIZED PARKING METERS AND A METHOD OF OPERATING SAID SYSTEM

[76] Inventor: Fardosht Amirpanahi, 1138 Mariner Cove, Sugarland, Tex. 77478

[21] Appl. No.: 508,394

[22] Filed: Jul. 31, 1995

[51] Int. Cl.⁶ .............................. G06F 19/00; C07F 17/24; C07B 15/02

[52] U.S. Cl. .................. 364/464.28; 194/217; 194/900; 235/375; 235/378; 368/90; 395/213

[58] Field of Search ............................ 194/217, 900; 235/375, 377, 378, 381; 340/825.33, 825.35, 932.2; 364/401 R, 464.01, 467, 569; 368/89, 90, 107, 108, 109

[56] References Cited

U.S. PATENT DOCUMENTS

| | | | |
|---|---|---|---|
| 3,141,292 | 7/1964 | Bailey et al. | 368/90 X |
| 3,166,732 | 1/1965 | Ljungman et al. | 368/90 X |
| 3,376,547 | 4/1968 | Auer, Jr. | 340/932.2 |
| 4,379,334 | 4/1983 | Feagins, Jr. et al. | 364/467 |
| 4,663,538 | 5/1987 | Cotton et al. | 194/217 X |
| 4,861,971 | 8/1989 | Chan | 235/384 |
| 5,029,094 | 7/1991 | Wong | 364/467 |
| 5,065,156 | 11/1991 | Bernier | 340/932.2 |
| 5,088,073 | 2/1992 | Speas | 368/90 |
| 5,103,957 | 4/1992 | Ng et al. | 194/217 |
| 5,424,940 | 6/1995 | Ousborne | 340/825.35 X |
| 5,570,771 | 11/1996 | Jacobs | 194/217 X |

Primary Examiner—Edward R. Cosimano
Attorney, Agent, or Firm—Maryam Bani-Jamali

[57] ABSTRACT

This invention provides a networked computerized parking system of networked computerized parking meters that are connected via a number of electric-transferring cables to a local power source and via a number of fiber optic network connections to one another and to a central database computer. Each networked computerized parking meter comprises: a main body connected to a base, a front surface, a back surface, a bottom and a top; a mother board positioned inside the main body, with the number of electric-transferring cables and the number of fiber optic network connections exiting from the bottom of the networked computerized parking meter; a parking violation light connected via detector cable to the mother board; a motion detector connected to the mother board via detector cable; a liquid crystal display (LCD) screen connected to the mother board via ribbon cable; a numeric code pad, comprising ten single-digital numeric, "ENTER" and "CANCEL" buttons, connected via ribbon cable to the mother board; and a magnetic strip reader connected via ribbon cable to the mother board, with a card insertion opening extending from the magnetic strip reader towards the front surface of the networked computerized parking meter. The motion detector determines start and completion of parking of a vehicle in vicinity of the networked computerized parking meter and refunds any unused, remaining parking fee from any parking charge card back to itself. A method of application of the networked computerized parking system is also presented.

14 Claims, 5 Drawing Sheets

NETWORKED COMPUTERIZED PARKING SYSTEM OF NETWORKED COMPUTERIZED PARKING METERS AND A METHOD OF OPERATING SAID SYSTEM

BACKGROUND OF THE INVENTION

1. Field of the Invention

This invention relates to a networked computerized parking system of networked computerized parking meters, said networked computerized parking system using a motion detector to determine start and completion of parking of a vehicle in its vicinity, thus refunding any remaining parking fee from a parking charge card to the parking charge card upon request for refund or upon removal of the vehicle. A method for operating said networked computerized parking system is also presented in this invention.

2. General Background and Description of Prior Art

Any discussion of an improved parking meter and parking system revolves around several major issues. Relatively older parking meters are limited to acceptance of coins and tokens for operation. Thus, a user of a parking space who does not have a correct total amount of changes and tokens will have to choose between getting a ticket and losing the difference between the total amount of the changes and of the tokens and the required amount of money. Also, coins and tokens sometimes get stuck in parking meters, thus, preventing the parking meter from functioning properly. In addition, a supervisor of the parking meter has to regularly empty parking meters and collect and count numerous coins and tokens leading to accounting mistakes. Parking meters are sometimes damaged in attempts to steal coins or in attempt to obtain free parking time from the parking meter. Bernier, U.S. Pat. No. 5,065,156, presents a computer-controlled coin parking meter for managing use of a parking lot of up to about ten parking spaces. Another more recent choice is using cards for computerized parking meters which operate without coins and to estimate a certain value to be deducted from a card in order to compensate for the amount of time that the user will be using said parking space. An example is indicated in U.S. Pat. No. 4,861,971, wherein Chan presents a parking meter capable of being operated in commercial parking facilities without monetary coins using a card. In both cases, the user is unable to predict the exact amount of time that his vehicle will remain at the parking space. There is always a possibility that any extra amount of monetary value from coins used and any extra amount of credit deducted from the card is wasted when the user moves the vehicle from the parking space before purchased time for the parking meter expires. Despite several advantages presented by an available computer system in the parking meter presented by Bernier, said parking meter is limited to being operated by coins. On the other hand, limiting parking meter functionality to cards without using monetary coins, as with Chan's design, is not a wise decision since many users, such as tourists, foreigners and visitors from other cities, do not necessarily own parking meter cards and many domestic users may not be carrying parking meter cards constantly.

Another issue that has been of concern for a long time has been monitoring said parking meters. To avoid coins and tokens getting stuck in and filling up parking meters, users failing to provide sufficient money, coin-operated meters being subject to vandalism, and parking meters failing to function properly, there is a constant need for a supervisor to check hundreds of parking meters on a regular basis in different streets constantly and simultaneously. Even electronic and computerized parking meters which simplify payment by user, tend to struggle with some aspects of monitoring said parking meters. For example, as shown in U.S. Pat. No. 4,379,334 by Feagins, Jr. et al., in electronic parking meters for parking lots, periodic checks must be made to assure that customers in fact are paying for parking. Application of said electronic parking meters requires a supervisor filling out a check sheet as said supervisor inventories a parking lot and then checking the check sheet against the money, coins as well as dollar bills, deposited in each electronic parking meter and against the credit applied from a credit card for each parking meter. Considering millions of parking meters that are used on a daily basis, a large amount of manpower would be wasted for monitoring parking meters.

Many solutions have been suggested to alleviate task of parking meter supervisors and increase efficiency of parking meter supervision. Computer control in parking meters has increased efficiency and decreased manpower required for operation of parking meters. The computer-controlled parking meter presented by Bernier, even though being only coin-operated, is capable of handling up to ten parking places simultaneously, thus speeding up the task of the parking meter supervisor. Using cards, as shown by Chan, eliminates meter emptying and simplifies accounting to a large extent. Providing a highly visible viewer display for an electronic parking meter, as presented by Speas in U.S. Pat. No. 5,088,073, increases discernability of time displays by parking meter supervisors and law enforcement personnel monitoring electronic parking meters, thus increasing efficiency of parking meter supervision. Computerized parking meters, as provided in U.S. Pat. No. 5,029,094 by Wong, diminish human-made errors in regards to occupancy rate of parking of parking meters, turn over rate of parking of parking meters and registration of total fees of parking meters. However, Wong presents a computerized parking meter system that is limited to operation by coins and is not as efficient as computer-controlled parking meters that use parking cards and that are capable of issuing receipts and calculating remaining balance on parking cards.

Although prior art acknowledges a variety of solutions for parking meter problems, it is believed that existing parking meters and computerized parking systems thereof have not been previously designed and used as efficiently as possible. While existing parking meters have been useful for their intended purposes, with growing populations and growing use of vehicles, said existing parking meters may fail to satisfy parking needs of largely populated cities. The present invention relates to improvements in parking meters and parking systems thereof and mitigates above mentioned drawbacks.

SUMMARY OF THE INVENTION

A primary object of the invention is to provide a networked computerized parking system of networked computerized parking meters such that, upon deduction of calculated parking fees from a parking charge card of a user, any unused parking fees can be recredited to the parking charge card upon request or upon removal of parked vehicle, minimizing waste of parking credit.

Another object of this invention is to devise a networked computerized parking system that can be operated by allowing parking fees to be charged to parking charge cards, as well as paid by feeding the networked computerized parking system with coins.

An additional object of this invention is to design networked computerized parking meters and a networked computerized parking system therefor that are easy and efficient to use and to operate, with officers and users saving money and time in locating illegal parking and available parking, respectively.

A further object of this invention is to provide a networked computerized parking system that substantially reduces manpower required for supervising operation of and maintenance of networked computerized parking meters.

Another object of the invention is to develop a networked computerized parking system that allows changes, by a central database computer server, in parking rates of parking meters that are part of said networked computerized parking system.

Still another object of this invention is to provide a networked computerized parking system through which a central database computer server can determine serving status of each networked computerized parking meter of said system that can be individually located and identified, thus significantly minimizing manpower required to control occupancy rate of parking meters, turn over rate of parking meters, calculation of and registration of parking fees for parking meters and functionality of parking meters.

A final object of this invention is to develop a networked computerized parking system that maximizes number of networked computerized parking meters that can be controlled by each server, thus increasing efficiency and decreasing total costs of the available parking meters and parking systems.

Additional objects and advantages of the invention will be set forth in part in a detailed description which follows, and in part will be obvious from the description, or may be learned by practice of the invention.

In general, the present invention has been developed against the above background, to provide application of a networked computerized parking system of networked computerized parking meters using a motion detector to determine start and completion of parking of a vehicle in vicinity of a networked computerized parking meter, refunding any remaining parking fee from a parking charge card to the same parking charge card upon request for refund or upon removal of the vehicle, and registering an insufficient payment for a parking time allowance on the parking charge card.

The present invention provides an improved parking system of networked computerized parking meters with a front surface, a back surface, a bottom and a top. Each networked computerized parking meter comprises a number of essential components, namely, a mother board attached to a liquid crystal display (referred to hereinafter as "LCD") screen, to a motion detector, to a magnetic strip reader connected to a card insertion opening, and to a numeric code pad. In addition to the number of essential components, a number of optional components may be used. There is an option of including a series of coin slots for accepting nickels, dimes, quarters and future dollar coins. A coin twister may be optionally located close to the series of coin slots and is turned after placement of a number of coins in any coin slot of the series of coin slots in order to drop a number of acceptable coins through a coin verifier into a safe box located below the coin verifier and drop any number of unacceptable coins out through a coin return opening located below the series of coin slots upon verification of the number of coins by the coin verifier connected to the mother board. If desired, the coin twister and the coin return opening on each networked computerized parking meter may be removed. The networked computerized parking meter would then retain the number of coins or any other object that is dropped into the networked computerized parking meter through the series of coin slots, but only would give parking time credit to the number of acceptable coins. Also, a timer may be optionally set in specified time intervals which also includes a visible pointer pointing to the remaining paid parking time. However, the timer may be completely removed and the information that is displayed on the timer may be digitally displayed on the LCD screen. A parking violation light may also be used to clearly and visibly indicate expiration of parking time credit.

The mother board is a vital component of each networked computerized parking meter and is connected via a number of fiber optic network connections to a number of other networked computerized parking meters and to a central database computer. In a most preferred embodiment, the mother board is placed inside the networked computerized parking meter at a distance from the front surface of the networked computerized parking meter that is larger than a space located between the back surface of the networked computerized parking meter and the back of the mother board. The number of fiber optic network connections leads downwards from the mother board to exit from the bottom of the networked computerized parking meter. The optional timer shares a section of the front surface of and may be set towards the top of the networked computerized parking meter, extending from vicinity of the mother board to the front surface of the networked computerized parking meter. The parking violation light preferably occupies a section of the front surface of the networked computerized parking meter shared by the timer. The motion detector is placed below the parking violation light and above the LCD screen. The numeric code pad with ten numeric buttons from "0" to "9", with an "ENTER" button, and with a "CANCEL" button is preferably placed below the LCD screen to be conveniently reachable by a user. The magnetic strip reader, which is in front of the mother board and inside of the networked computerized parking meter, is preferably vertically in between the timer and the coin verifier and horizontally in between the numeric code pad and the mother board. The card insertion opening extends from the magnetic strip reader towards the front surface of the networked computerized parking meter and creates an opening for insertion of parking charge cards (i.e., a card insertion opening) at the front surface of the networked computerized parking meter preferably under the numeric code pad. The series of coin slots, as well as the coin twister, are placed as close as possible and preferably under the card insertion opening to be within convenient reach of the user. The coin verifier is connected preferably to a lower portion of the front of the mother board. The safe box, which is under the coin verifier and is relatively large in size, is internal even though a locked openable door covers the safe box which can be opened by a networked computerized parking meter supervisor for removing coins when the safe box is filled or when coins are stuck in a first coin path connecting the coin verifier to the safe box. In an efficient design, said safe box is located under other components towards the bottom of the networked computerized parking meter. The coin return opening, located below the series of coin slots, is preferably located between the coin verifier and the safe box.

It should be noted that the above described arrangement of the number of essential components of the networked computerized parking meter is solely a preferred embodiment. Many other arrangements of the number of essential components, with or without the number of optional components, are possible. For example, the magnetic strip reader could possibly be moved up to be located between the LCD screen and the numeric code pad. The motion detector could be moved to be positioned at a lower section of the front surface of the networked computerized parking meter or any other position on the front surface as long as the motion of the parked vehicle is detectable by the motion detector. Meanwhile, the LCD screen and the numeric code pad could be placed side by side with the magnetic strip reader. The timer, the parking violation light, the numeric code pad, the magnetic strip reader, the series of coin slots, the coin twister, the coin return opening and the locked openable door covering the safe box may be designed to be located in different sections of, preferably the front surface of, the parking meter, as long as each component is visible and each component that has to be reached is within reach of users, whether standing or sitting.

This invention presents a method for operating said networked computerized parking system of networked computerized parking meters. The networked computerized parking meters are each connected via the number of fiber optic network connections to a number of other networked computerized parking meters and to the central database computer through a wide area network. Inside each networked computerized parking meter, the mother board determines parking rate for each parking space, geographic location of each networked computerized parking meter, unique identification of each networked computerized parking meter, and parking status of each networked computerized parking meter. The mother board also reads parking charge cards, subtracting parking fee from prepaid parking cards. Owners of parking credit account cards and credit cards purchased from companies receive bills on a monthly basis or within a set period of time.

Said networked computerized parking meter can be operated very efficiently. The mother board operates the motion detector of the networked computerized parking meter. The motion detector scans in front of the networked computerized parking meter for parked vehicles and sends a signal to the mother board upon determining that a parked vehicle has been parked in the parking space for longer than a certain amount of time. If after said amount of time the user of the parking space has not paid parking fees, the networked computerized parking meter continues shining a parking violation light. Upon pressing of buttons of the numeric code pad, the mother board displays parking information on the LCD screen. To prevent vandalism of parking charge cards, the parking charge cards are checked when customers enter personal identification numbers through the numeric code pad, said personal identification number being transferred to the mother board and checked by the central database computer server. A head of the magnetic strip reader scans information off a magnetic strip on the parking charge card, with the information being passed to the mother board. If the personal identification number and the information read off the magnetic strip are verified by the central database computer server, parking time can be purchased using parking charge cards. Then, the mother board operates the timer in set intervals on the networked computerized parking meter and communicates through a network with the central database computer. When the user enters a cancellation command on the numeric code pad or when the vehicle is removed from the parking space, the motion detector signals to the mother board to stop charging any parking charge card for the parking space.

It is to be understood that the descriptions of this invention are exemplary and explanatory, but are not restrictive, of the invention. Other objects and advantages of this invention will become apparent from the following specification and from any accompanying charts, tables, examples and drawings.

BRIEF DESCRIPTION OF CHARTS, TABLES, EXAMPLES AND DRAWINGS

Any accompanying charts, tables, examples and drawings which are incorporated in and constitute a part of this specification, illustrate examples of preferred embodiments of the invention and, along with the description, serve to explain the principles of the invention.

DETAILED DESCRIPTION OF THE PREFERRED EMBODIMENT

Preferred embodiments of the present invention are illustrated in any charts, tables, examples and drawings that follow.

In a most preferred embodiment of the present invention, a networked computerized parking system of a number of networked computerized parking meters 50 is presented. A networked computerized parking system uses a motion detector 7 existing in each networked computerized parking meter 50 to determine start and completion of parking of a vehicle in vicinity of a networked computerized parking meter 50, thus refunding any remaining parking fee from a parking charge card to the parking charge card upon request for refund or upon removal of the vehicle. Parking charge cards comprise any combination of parking credit account cards, prepaid parking cards and credit cards. The networked computerized parking system is also determined to operate with appropriate coins.

Figure 1:
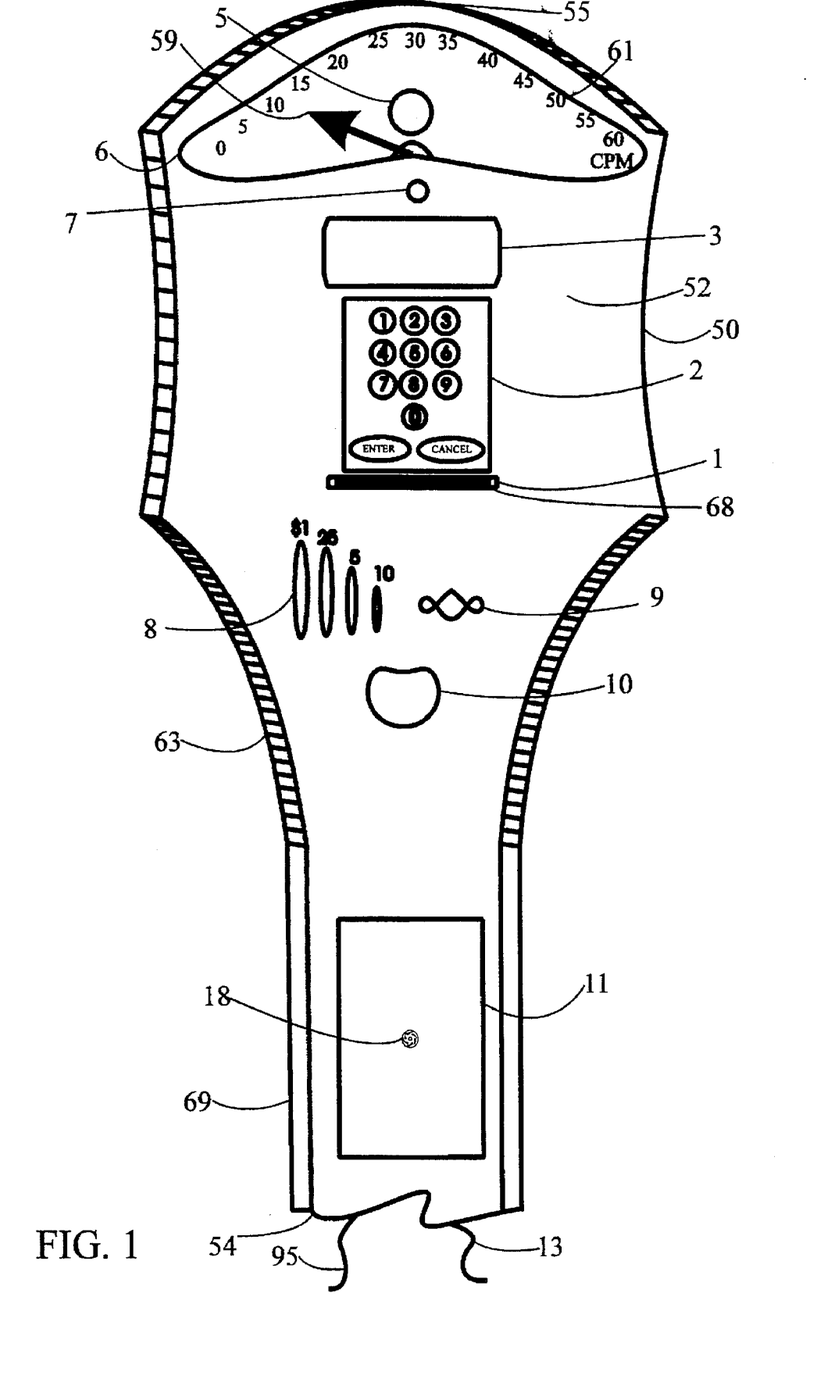
FIG. 1 is a schematic diagram showing a perspective front view of a preferred embodiment of a networked computerized parking meter.
Figure 4:
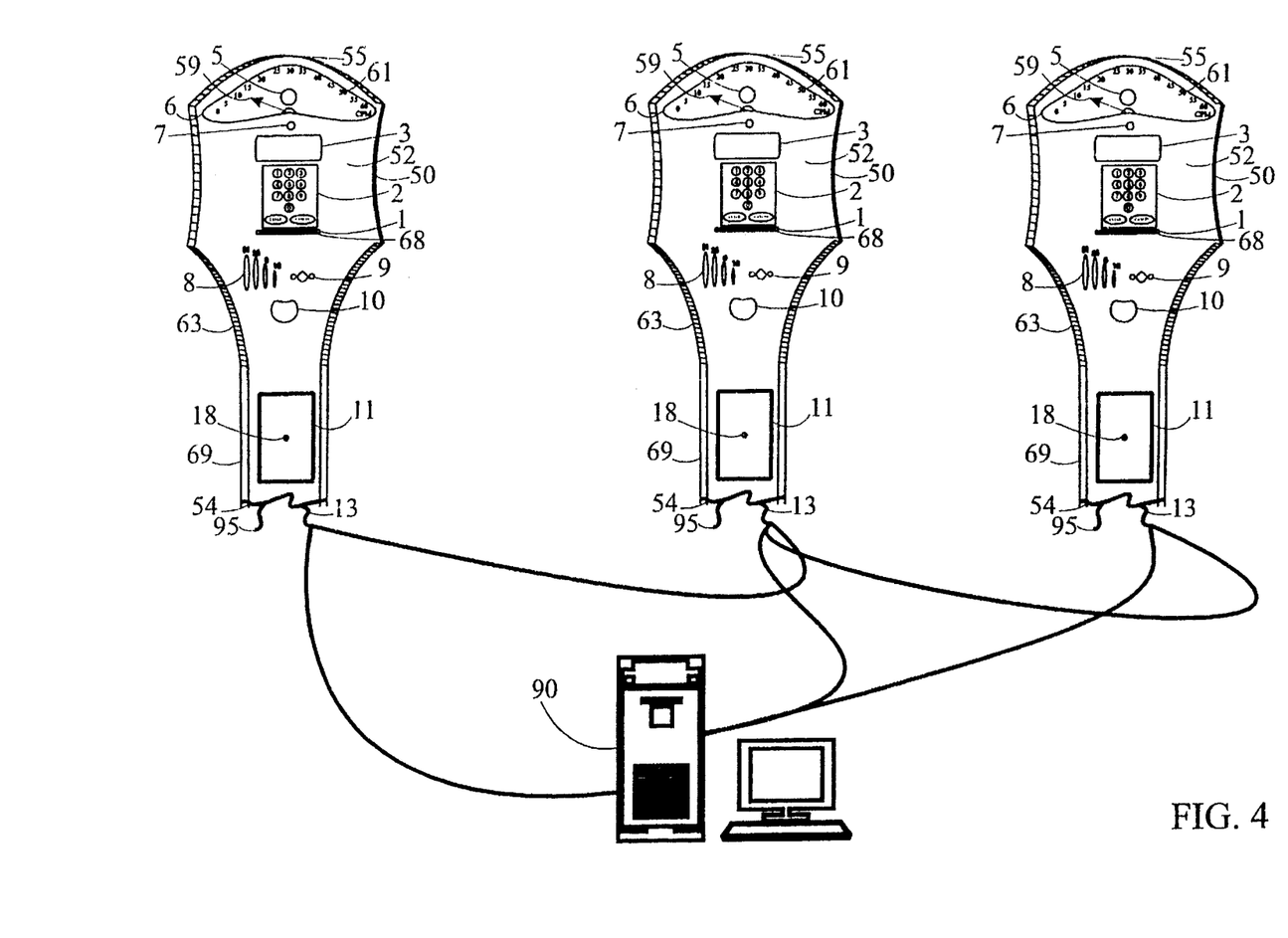
FIG. 4 is a front view of a preferred embodiment of a networked computerized parking system of networked computerized parking meters connected to each other via a number of fiber optic network connections and connected to a central database computer via the number of fiber optic network connections.
Figure 5:
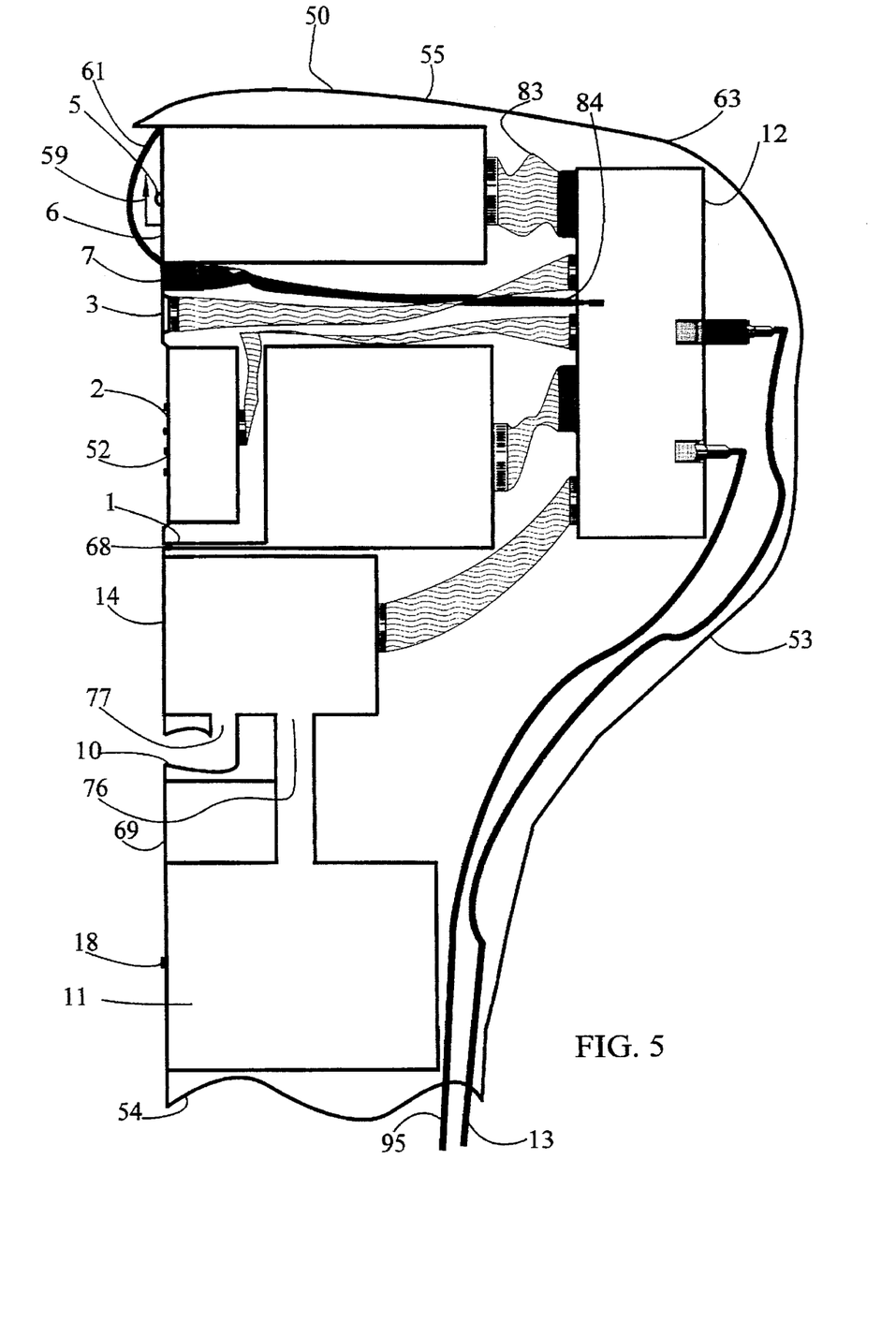
FIG. 5 is a cross-sectional view of a preferred embodiment of the networked computerized parking meter, without showing components of the networked computerized parking meter in detail.

As shown in FIG. 1, FIG. 4 and FIG. 5, the networked computerized parking meter 50 has a main body 63 that is mounted on and connected to a base 69. The networked computerized parking meter 50 has a front surface 52, a back surface 53 (only shown in FIG. 5), a bottom 54 and a top 55. The front surface of the networked computerized parking meter 50 is demonstrated in FIG. 1. In the main body 63, a mother board 12 (shown in FIG. 2, which shows a number of internal components of the networked computerized parking meter 50 (not shown in FIG. 2) and how said number of internal components are interconnected, and in FIG. 5), with a front and a back, is adjusted inside and optionally close to the back surface 53 of the networked computerized parking meter 50 in order to be connected to a number of components of the networked computerized parking meter 50 and to a motion detector 7 of the networked computerized parking meter 50 in a most efficient and simple way, using least amount of ribbon cable 83 and motion detector cable 84, respectively (please refer to FIG. 5). As shown in FIG. 5, the number of components and the motion detector 7 are located inside the networked computerized parking meter 50 and share a section of the front surface 52 of the networked computerized parking meter 50.

As shown in FIG. 5, ribbon cable 83 connects an upper portion of the front of the mother board 12 to a timer 6 located in the main body 63. The timer 6 has a front which preferably shares an upper section of the front surface 52 of the networked computerized parking meter 50 and has a back that is connected to the upper portion of the front of the mother board 12 by the ribbon cable 83. The timer intervals specified time intervals by which paid parking time bought by a user decreases to zero. A pointer 59 on the front of the timer 6 points to an amount of time purchased by the user, with the pointer 59 being updated for entry of each coin, as well as for insertion of and for credit from any parking charge card. Upon passage of time, the pointer 59 indicates any remaining paid parking time. A parking violation light 5 is preferably positioned on the front of the timer 6. A transparent cover 61 extends over an upper section of the front surface 52 of the networked computerized parking meter 50, covering the timer 6.

The motion detector 7 lies below the timer 6, takes up a very small section of the front surface 52 of the networked computerized parking meter 50, but plays a major role in operation of the networked computerized parking meter 50. As shown in FIG. 5, from a rear side, the motion detector 7 is connected via motion detector cable 84 to the front of the mother board 12. Preferably, the motion detector cable 84 is attached to a middle portion of the front of the mother board 12.

Below the timer 6, and preferably below the motion detector 7, a liquid crystal display screen 3 (referred to hereinafter as "LCD" screen 3), with a front and a back, is placed (please refer to FIG. 1). The front of the LCD screen 3 takes up a section of the front surface 52 of the networked computerized parking meter 50, with remaining parts of the LCD screen 3 located inside and in the main body 63 of the networked computerized parking meter 50 and not visible from outside. As shown in FIG. 5, ribbon cable 83 is connected from the upper portion of the front of the mother board 12 to the back of the LCD screen 3.

As shown in FIG. 1, a numeric code pad 2 with ten numeric buttons from "0" to "9", with an "ENTER" button and with a "CANCEL" button, is preferably positioned immediately under the LCD screen 3, in the main body 63 of the networked computerized parking meter 50, in order to be in comfortable reach of the user of the networked computerized parking meter 50. As shown in FIG. 5, the numeric code pad 2 has a back and a front which shares a section of the front surface 52 of the networked computerized parking meter 50. Ribbon cable 83 connects the middle portion of the front of the mother board 12 to the back of the numeric code pad 2.

FIG. 5 indicates that a magnetic strip reader 1 is placed in the main body 63 of the networked computerized parking meter 50 between the mother board 12 and the numeric code pad 2 and has an external connection only through a card insertion opening 68 close to, and preferably under, the numeric code pad 2 (please refer to FIG. 5). The magnetic strip reader 1 is connected by ribbon cable 83 to the middle portion of the front of the mother board 12 as well.

Figure 2:
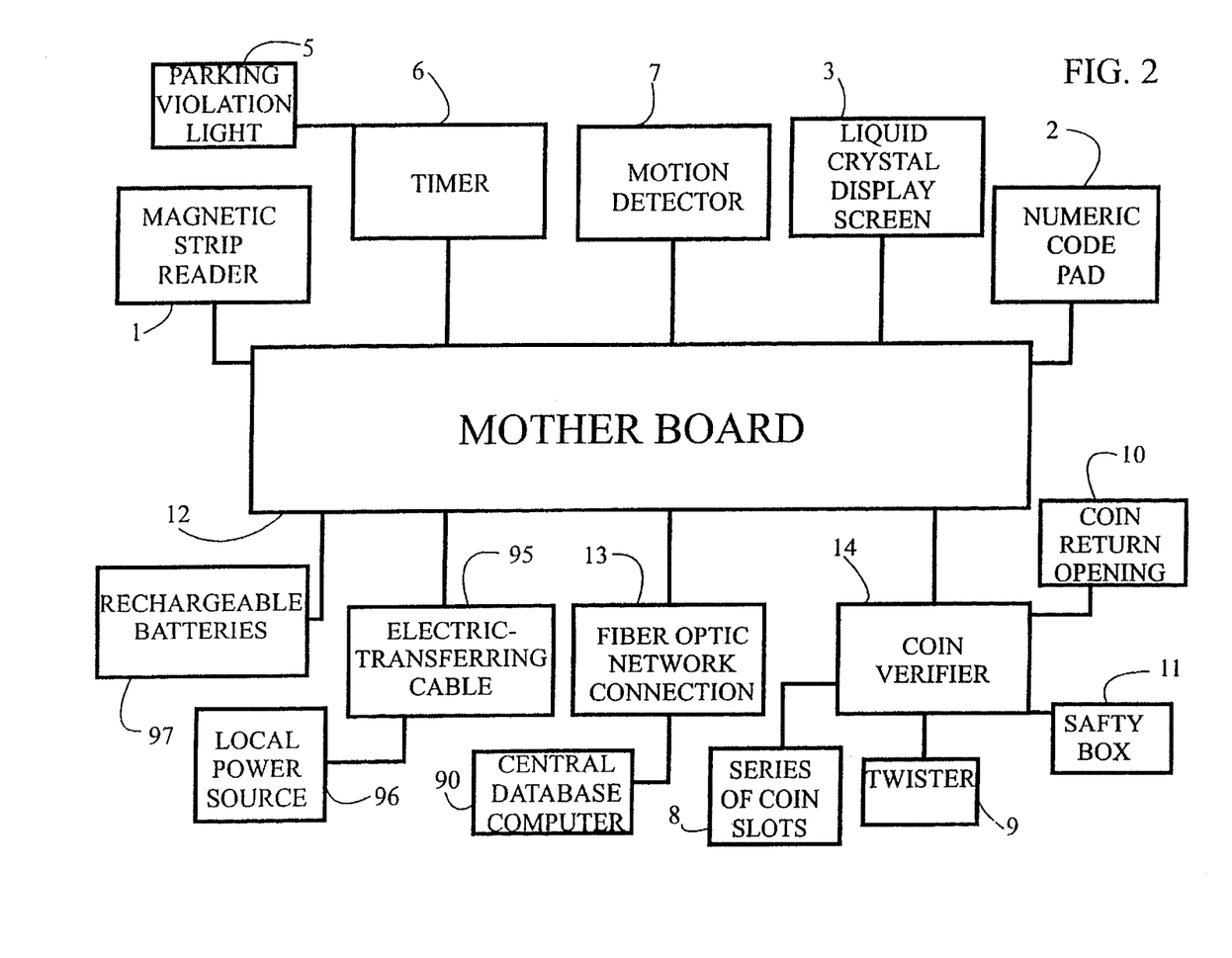
FIG. 2 is a diagrammatic illustration of the preferred embodiment of the networked computerized parking meter shown in FIG. 1.

Preferably below the magnetic strip reader 1 and in the main body 63 is a coin verifier 14 (as shown in FIG. 5) which is located inside the networked computerized parking meter 50 and is connected to a portion of the front of the mother board 12 via ribbon cable 83. As shown in FIG. 1, a series of coin slots 8 for accepting nickels, dimes and quarters, as well as future dollar coins, are located below the card insertion opening 68, considering the fact that in the near future dollar coins will replace dollar bills. A coin twister 9 is located close to the series of coin slots 8 and is turned after placement of a number of coins in any coin slot in the series of coin slots 8. Upon verification of the number of coins by the coin verifier 14, a number of acceptable coins is dropped into a safe box 11 (shown in FIG. 2 and FIG. 5) located below the coin verifier 14 and a number of unacceptable coins is dropped out through a coin return opening 10 (refer to FIG. 1, FIG. 2 and FIG. 5) located below the coin verifier 14 and the series of coin slots 8 and above the safe box 11. As indicated in FIG. 5, the coin verifier 14 is connected by a first coin path 76 to the safe box 11 and by a second coin path 77 to the coin return opening 10. The safe box 11 is located in the base 69 of the networked computerized parking meter 50. Said mother board 12 is connected via a number of fiber optic network connections 13 (please refer to FIG. 1, FIG. 2, FIG. 4 and FIG. 5) to a number of other networked computerized parking meters 50 and to a central database computer 90 (shown in FIG. 4 and FIG. 2). The networked computerized parking meters 50 are also connected by a number of electric-transferring cables 95 to a local power source 96 (as shown in FIG. 2) that is a major source of electrical power of the networked computerized parking meters 50 of each locality. A number of rechargeable batteries 97 (shown in the FIG. 2) can also be used as an option upon disconnection of electrical power from the locality. The central database computer 90 can reach each networked computerized parking meter 50 and signals can be mutually transferred between said central database computer 90 and each networked computerized parking meter 50.

As shown in FIG. 5, in a most preferred embodiment, the mother board 12 is placed inside the networked computerized parking meter 50 at a distance from the front surface 52 of the networked computerized parking meter 50 that is larger than a distance between the back of the mother board 12 and the back surface 53 of the networked computerized parking meter 50. The number of fiber optic network connections 13 leads downwards from the back of the mother board 12 to exit from the bottom 54 of the networked computerized parking meter 50. The timer 6 is set towards the top 55 of the networked computerized parking meter 50 and extends from vicinity of the mother board 12 to an upper section of the front surface 52 of the networked computerized parking meter 50. The parking violation light 5 preferably occupies a section of the front surface 52 of the networked computerized parking meter 50 shared with the timer 6. The motion detector 7 is placed below the parking violation light 5 and above the LCD screen 3. In a most preferred embodiment, the numeric code pad 2 is placed below the LCD screen 3 to be conveniently reachable by a user. The magnetic strip reader 1, which is in front of the mother board 12 and inside of the networked computerized parking meter 50 (as shown in FIG. 5), is preferably in between the timer 6 and the coin verifier 14. The magnetic strip reader 1 has a front and a back. The card insertion opening 68 extends from the front of the magnetic strip reader 1 towards the front surface 52 of the networked computerized parking meter 50, with the card insertion opening 68 located under the numeric code pad 2. The series of coin slots 8, as well as the coin twister 9, are placed close to and preferably under the card insertion opening 68 to be within convenient reach of the user. The coin verifier 14 is connected preferably to a lower portion of the mother board 12. The safe box 11, which is under the coin verifier 14 and is relatively large in size, serves as internal storage for deposited coins and is covered by a locked openable door 18 (as shown in FIG. 1, FIG. 4 and FIG. 5), said locked openable door 18 providing access to the safe box 11 for cash removal and service. In an efficient design, said safe box 11 is located under other components towards the bottom 54 of the networked computerized parking meter 50. The coin return opening 10, located below the series of coin slots 8, is preferably located between the coin verifier 14 and the safe box 11.

Said locked openable door 18 may be unlocked and opened by a supervisor of the networked computerized parking meters 50 for removing coins when the safe box 11 is filled and when coins are stuck in the first coin path 76 connecting the coin verifier 14 to the safe box 11 (please refer to FIG. 5). As an option, said supervisors may be able to open the locked openable door 18 by pressing a given predetermined code on the numeric code pad 2. It may be advisable to regularly alter said given predetermined code to minimize vandalism. To maximize security of the safe box 11, the supervisor who has access to the safe box 11 should preferably be different from persons responsible for maintenance and repair.

The back surface 53 of the networked computerized parking meter 50 can be removable to facilitate repair without requiring removal of the entire networked computerized parking meter 50 for repair. In spite of presenting removal potentials, said back surface 53 is tightly fastened to the networked computerized parking meter 50 using custom-designed screws to minimize chances of vandalism. If the top 55 and the bottom 54 of the networked computerized parking meter 50 are tightly fastened to one another, removal of the top 55 from the bottom 54 of the networked computerized parking meter 50 in performing repair-work can also be an option. It should be noted that in situ removal of the back surface 53 and performing repair without necessitating transportation of the top 55 of the networked computerized parking meter 50 results, at least, in saving in man-hours required for transportation.

In building the networked computerized parking meter 50, a number of essential components, namely the mother board 12, the LCD screen 3, the motion detector 7, the magnetic strip reader 1 connected to the card insertion opening 68, and the numeric code pad 2, is required. In addition to said number of essential components, a number of optional components may be used. The above described arrangements of the number of essential components and the number of optional components are some of the possible embodiments of the present invention. Many other arrangements of the number of essential components, with or without the number of optional components, are possible. If desired, the series of coin slots 8, the coin verifier 14 and the safe box 11 may be used to allow usage of coins in purchase of parking time. Another option would be to use the coin twister 9 and the coin return opening 10 to provide the means for returning the number of unacceptable coins through the coin return opening 10 upon verification of the number of coins by the coin verifier 14 connected to the mother board 12. Another component that may be used on an optional basis is the timer 6. If the timer 6 is not used, the information that would be displayed on the timer 6 may be displayed on the LCD screen 3. Another optional component is the parking violation light 5 which may be used to clearly and visibly indicate expiration of parking time credit. Meanwhile, positions of said number of essential components and said number of optional components may be varied. For example, the magnetic strip reader 1 could possibly be moved up to be located between the LCD screen 3 and the numeric code pad 2. The motion detector 7 could be moved to be positioned at a lower section of the front surface 52 of the networked computerized parking meter 50 or any other position on the front surface 52 as long as the motion of the parked vehicle is detectable by the motion detector 7. Meanwhile, the LCD screen 3 and the numeric code pad 2 could be placed side by side with the magnetic strip reader 1. The timer 6, the parking violation light 5, the LCD screen 3, the numeric code pad 2, the magnetic strip reader 1, the series of coin slots 8, the coin twister 9, the coin return opening 10 and the locked openable door 18 covering the safe box 11 may be designed to be located in different sections of, preferably the front surface of, the parking meter, as long as each component is visible and each component that has to be reached is within reach of sitting or standing users.

Due to use of above listed components in producing the networked computerized parking meter 50, parking fees may be charged to parking charge cards, or paid by feeding the networked computerized parking meter 50 with coins. Thus, present modes of payment being used on networked computerized parking meters 50 are being improved upon to, in addition to allowing tourists and visitors to easily use the networked computerized parking meter 50 by feeding coins, create a new payment system that can have several other options. In addition to payment by coins, a parking meter user may pay for parking expenses by using any combination of prepaying parking fees to a governmental body responsible for parking within a specific area or within a specific state, of charging parking fees to parking credit accounts between the user and credit companies, and of charging parking fees to credit cards. Prepaid parking cards can be purchased from authorized locations and vending machines by prepaying for parking fees. If any combination of parking charge cards is used, the vending machine prompts the user for a new personal identification number, i.e. a new password. Otherwise, the vending machine allows the user to change an existing password upon provision of an existing password by the user. For prepaid parking cards, the vending machine credits an account of the user for the amount of cash inserted, said amount of paid cash being recorded on a magnetic strip existing on each prepaid parking card. With the variety of options available, problems that exist with available parking meters that are limited in choices of methods of payment, such as problems resulting from available parking meters that operate without coins and resulting from available parking meters that operate solely with coins, are easily solved. The present invention can also be designed to accept dollar bills, as well as coins and parking charge cards. However, provision of a networked computerized parking meter that can also accept dollar bills results in a more complicated networked computerized parking system.

Figure 3:
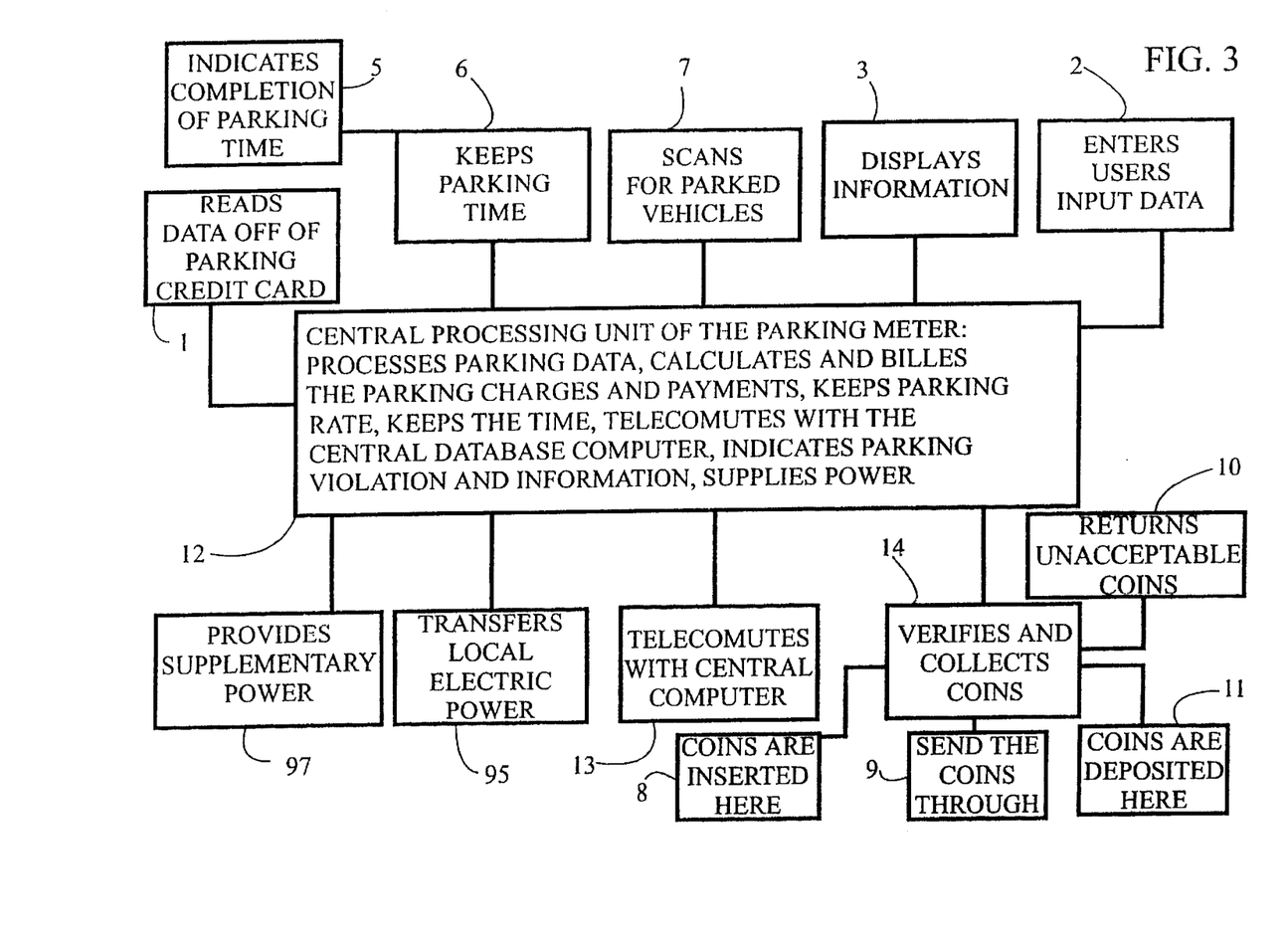
FIG. 3 is a block diagram showing the function of the preferred embodiment of the networked computerized parking meter shown in FIG. 1.

This invention presents the method of operating a networked computerized parking system of networked computerized parking meters 50. As shown in FIG. 4, each networked computerized parking meter 50 is connected via the number of fiber optic network connections 13 to a number of other similar networked computerized parking meters 50 and to the central database computer 90 through a wide area network. The mother board 12 inside each networked computerized parking meter 50 determines parking rate for each parking space, geographic location of each networked computerized parking meter 50, unique identification of each networked computerized parking meter 50, and parking status of each networked computerized parking meter 50. Upon insertion of a parking charge card into the card insertion opening 68, the mother board 12, through the magnetic strip reader 1, reads existing account information off a magnetic strip located on said parking charge card. (Please refer to FIG. 3.) The parking fee is subtracted from a remaining amount of payment of prepaid parking cards. Owners of parking credit account cards and of credit cards purchased from companies periodically receive a bill that has to be paid within a specified period. To prevent vandalism of parking charge cards, the parking charge cards are checked when customers enter personal identification numbers using the numeric code pad 2. When a desired amount of parking time is to be purchased, the user enters personal identification numbers and presses the "ENTER" button on the numeric code pad 2. The user is allowed to restart or to correct any committed errors by pressing the "CANCEL" button. The personal identification numbers are transferred as passwords to the mother board 12 and checked by a central database computer server. If the personal identification number is verified by the central database computer server, parking time can be purchased using parking A head cards. A head of a magnetic strip reader 1 scans information off a magnetic strip on the parking charge card, with the information being passed to the mother board 12. The information about an amount deposited and expiration time is stored in the mother board 12. After checking balance of the prepaid parking card and checking a card identifying code entered by the user, the mother board 12 determines whether the pointer 59 of the timer 6 should be moved to indicate amount of parking time desired to be purchased by the user. Starting the timer 6 may be rejected for various reasons including, but not limited to, insufficient balance on the prepaid parking card, nonfunctionality of the networked computerized parking meter 50, or prevention of purchase of parking time for said networked computerized parking meter 50 by the central database computer 90.

If the personal identification number entered through the numeric code pad 2 into the networked computerized parking meter 50 matches the password on the inserted parking charge card, the networked computerized parking meter 50 acknowledges the correct personal identification number. The mother board 12 then displays any related parking information on the LCD screen 3 for verification by a user of the networked computerized parking meter 50 so that the user may erase any erroneously entered information. (Please refer to FIG. 3.) Said information comprises an existing parking rate (e.g. in dollars per minute) for the parking space to be occupied and a remaining time credit on the parking charge card if a prepaid parking card is being used. If the prepaid parking card has any time credit remaining, the networked computerized parking meter 50 calculates the amount of time (i.e. in minutes) remaining on the prepaid parking card by dividing the credit amount remaining by the parking rate for said parking space. On the other hand, if parking credit account cards or credit cards are inserted into the card insertion opening 68, the pointer 59 of the networked computerized parking meter 50 points to a "CPM" (i.e. Computerized Parking Meter) mark, located most preferably on an extreme end on the timer 6 on a section of the front surface 52 of the networked computerized parking meter 50, thus representing that the user is capable of using a maximum amount of parking time allowed for the parking space. Maximum parking times (e.g. 24 hours) are set to prevent users of networked computerized parking meters 50 to leave their car in each parking space for longer than the maximum parking time. After a few seconds, the information visible on the LCD screen 3 disappears until the user presses any button on the numeric code pad 2. If the timer 6 is not used on the networked computerized parking meter 50, the information regarding timing appears on the LCD screen 3, with a "CPM" sign appearing on the LCD screen 3 upon usage of parking credit account cards and credit cards. With prepaid parking cards, the total parking time being used and the remaining time are indicated on the LCD screen 3. The LCD screen 3 may be adjusted to indicate the total parking time being used for parking credit account cards and for credit cards, as well.

Meanwhile, unless parking payment is made by parking credit account cards or by credit cards, the mother board 12 operates the timer 6 in set intervals on the networked computerized parking meter 50, displaying any remaining, unused parking time on a section of the front surface 52 of the networked computerized parking meter 50.

The pointer 59 of the timer 6 of the networked computerized parking meter 50 returns to "zero" under at least one of the following conditions:

(a) reinsertion of the parking charge card into the magnetic strip reader 1 and pressing of the "CANCEL" button on the numeric code pad 2;
(b) reaching the maximum amount of parking time that is allowed by authorities;
(c) removal of the vehicle from the parking space; and
(d) termination of any paid parking time.

Upon reinsertion of the parking charge card into the magnetic strip reader 1 and pressing of the "CANCEL" button on the numeric code pad 2, the networked computerized parking meter 50 erases any unexpired time. Thus, a new time frame is started for each new user and each new user does not take advantage of any unexpired time of a previous user. The networked computerized parking system credits the parking charge card with the unused amount of parking fee. Identification information of the parking charge card is transferred to the central database computer 90 upon insertion of the parking charge card into the card insertion opening 68 so that any unused amount of parking fee is added back to the remaining, unused value of the parking charge card. Thus, the user no longer has to drive away knowing that some parking time is still left on the parking meter, without being able to get a refund or return of credit. Under the present networked computerized parking system, the user pays for exactly the parking time used by the user. In addition, the identification information is checked to assure that any refund only goes back to the parking charge card originally entered into the card insertion opening 68, i.e the code of the parking charge card entered for refund matches with the code of the parking charge card originally entered for purchase of parking time. The central database computer 90 uses any remaining, unused parking time and the appropriate parking rate to calculate the refund to and calculate and retain a new value for the parking charge card, with the LCD screen 3 indicating the refund and the new value for the parking charge card. Said new value is recorded on the parking charge card if the parking charge card is inserted into the card insertion opening 68 of any networked computerized parking meter 50 that is connected to the same central database computer 90 as the original networked computerized parking meter 50 is. As the parking charge card is removed from the card insertion opening 68 or when the vehicle is moved away from the networked computerized parking meter 50, the timer 6 is then set to "zero" to avoid any double refunds.

The mother board 12 operates the motion detector 7 of the networked computerized parking meter 50 and communicates through a network with the central database computer 90. The motion detector 7 scans in front of the networked computerized parking meter 50 for parked vehicles (refer to FIG. 3) and sends a signal to the mother board 12 upon determining that a vehicle has been parked in the parking space for longer than a certain amount of time. By using infrared sensors, the motion detector 7 has a capability of scanning a distance of several feet, preferably about three feet, in front of the networked computerized parking meter 50 for parked vehicles. Once the motion detector 7 determines that a vehicle has been standing still in about three-feet proximity of the networked computerized parking meter 50 for longer than several minutes, preferably about five minutes, the motion detector 7 sends a signal to the mother board 12 that the parking space in front of the networked computerized parking meter 50 is in use. If after a short period of time, the user of the parking space has not paid the required parking fee by any combination of payment methods, i.e. placing a number of coins in any coin slot of the series of coin slots 8 or inserting the parking charge card in the card insertion opening 68, the networked computerized parking meter 50 turns on the parking violation light 5. Said parking violation light 5 assists any passing police officers to notice any users who are not paying their parking fees. In addition, due to connection of networked computerized parking meters 50 with the central database computer 90 via the number of fiber optic network connections 13, upon turning on of the parking violation light 5, a signal that is sent to the mother board 12 notifies the central database computer server of occurrence of a parking violation. Upon occurrence of a parking violation, central database computer servers can notify police officers in an area or supervisors in a parking locality to issue parking tickets to the vehicle in parking violation. If the user of the networked computerized parking meter 50 has already entered the personal identification number through the numeric code pad 2 for approval, issuing a parking ticket is even simpler since the central database computer server has already access to information about the user of the networked computerized parking meter 50. When the vehicle is removed from the parking space, the motion detector 7 detects removal of the vehicle and signals to the mother board 12 to stop charging any parking charge card for the parking space, i.e. the pointer 59 of the timer 6 moves back to "zero". At a time when cities are struggling to meet their budget shortfalls, the networked computerized parking system has tremendous benefits for the municipalities. It helps to provide an improved fee collection system that is more efficient. With the application of the networked computerized parking system, the need for patrols walking around the streets in order to catch parking violators will become obsolete. The networked computerized parking system would be able to indicate to a central dispatch the exact location of and the length of a parking violation. Meanwhile, users of parking spots would be charged parking fees for the exact time that they have used the parking spot.

Unless credit cards are used, upon payment of parking fees by the user of the parking space, the timer 6 displays any available time left on the networked computerized parking meter 50 in short time intervals, preferably in five-minute intervals. Count down of paid parking time starts from activation of the networked computerized parking meter 50. Any allowable time for each networked computerized parking meter 50 depends on a maximum allowable time for different parking spaces and method of payment of parking fees. The maximum allowable time for each parking space is set by police officers or by owners of the networked computerized parking system. The maximum allowable time can vary depending upon location of the parking space and method of payment of the parking fees. Different areas may have different rates and different parking rules. Utilization of the networked computerized parking system assists to a great extent in adjusting said different rates on different networked computerized parking meters 50, with each central database computer server performing a task presently performed on individual existing parking meters by several supervisors. Thus, municipalities would be capable of remotely changing the parking rate for individual parking units. For instance, during ball games, concerts, conventions or other similar events in specific facilities, the parking rate for the parking spots around said facilities may be changed during the event. With the networked computerized parking system, said parking rate changed would require minimal additional manpower effort. Meanwhile, data collected from each networked computerized parking meter 50 would provide information which could help to determine which areas of a municipality have higher demand for parking facilities. Said information could be used to increase revenues generated from parking and design and implementation of traffic laws and regulations that would remove traffic bottlenecks. In addition, the data collected from said networked computerized parking system could be used for market research. Retailers may be interested to establish their businesses in locations showing higher demands for parking spots. The sale of such collected data could generate a new source of revenue. Also, the central database computer server may allow longer parking periods for holders of parking charge cards, thus increasing efficiency of the networked computerized parking system 50 by encouraging more users to stop using coins. The method of payment also can decide the allowable time for networked computerized parking meters 50. Any parking credit account card and any credit card would allow parking to the maximum time allowed by issuer of said parking credit account cards and of said credit cards, respectively. Upon insertion of any parking credit account cards and of any credit cards into the card insertion opening 68, the timer 6 moves to a card sign 4, indicated as "CPM", preferably located at a corner on the timer 6 appearing on a section of the front surface 52 of the networked computerized parking meter 50 (as shown on FIG. 1). When the pointer 59 points to CPM, the timer 6 indicates that the networked computerized parking meter 50 is running on a parking credit account card or on a credit card. Thus, the user would not need to worry about the termination of the allowed parking time and the necessity to return to the networked computerized parking meter 50 within a limited time interval to purchase more parking time. In contrast to parking credit account cards and to credit cards, prepaid parking cards provide parking time credit for the smaller of a maximum allowable time and of an amount of parking time credit remaining on the prepaid parking card.

Operation of the networked computerized parking meter 50 by using a number of coins allows parking for the maximum amount of time assigned to the networked computerized parking meter 50, as long as empty space remains in the safe box 11, as long as no coin is stuck in the first coin path 76 connecting the coin verifier 14 to the safe box 11, as long as the coin is accepted by the coin verifier 14 and as long as the user has not run out of coins. After each coin is dropped in any coin slot of the series of coin slots 8 of the networked computerized parking meter 50, the coin twister 9 is turned. The coin verifier 14 identifies the coin, i.e. nickel, dime, quarter, or dollar coin. The number of unacceptable coins, e.g. pennies, Canadian coins, and tokens, is dropped out through the coin return opening 10. The coin verifier 14 drops the number of acceptable coins into the safe box 11, while giving the user credit for using the networked computerized parking meter 50 for the amount paid when the mother board 12 directs the timer 6 to move the pointer 59 to a correct position on the timer 6. As is clearly visible, application of parking charge cards is more preferable to using coins. When parking charge cards, particularly prepaid parking cards, are used, parking fees are received more quickly and more conveniently. Rate changes can be handled without physical changes to the networked computerized parking meter 50 and to the parking charge cards of the user. Also, parking fees applied for parking charge cards may be set at a lower parking rate than parking rate set for coins. Most importantly, upon using parking charge cards, emptying of networked computerized parking meters 50 is eliminated and accounting is greatly simplified, cancelling potential errors resulting from collection of and counting of coins by supervisors. However, having a combination of different methods of payment on each networked computerized parking meter 50 is definitely an advantage.

In addition to being used for operating networked computerized parking meters 50 for vehicles, said networked computerized parking system may also be used for parking boats, ships and small planes, to name a few.

The networked computerized parking system for the described networked computerized parking meter 50 can be operated by using any combination of parking charge cards, as well as by feeding the networked computerized parking meter 50 with coins, thus creating a networked computerized parking system that is easy and convenient to use for visitors and tourists as well as for residents of municipalities. By completing many functions previously performed by parking meter supervisors who had to regularly supervise hundreds and even thousands of parking meters on a regular basis in order to maximize parking payments, said networked computerized parking system substantially reduces manpower required for supervising operation of said networked computerized parking system. For example, no networked computerized parking meter 50 should be out of service for several days due to a minor malfunction, since the networked computerized parking system 50 would immediately notify the center that maintenance is required. The networked computerized parking system maximizes the number of networked computerized parking meters 50 that can be controlled by each central database computer server, thus increasing efficiency and decreasing total costs of the networked computerized parking system.

One unique aspect of the networked computerized parking system is ability to update parking charge cards, as well as of any unused credit, upon overpayment of parking fees. The networked computerized parking system is designed to indicate the correct parking time upon deducting calculated fees from prepaid parking cards of networked computerized parking meters 50, upon adding calculated fees to bills for parking credit account cards and for credit cards, and upon rejecting the number of unacceptable deposited coins through the coin return opening 10 and depositing the number of acceptable coins in the safe box 11. Meanwhile, the networked computerized parking system is capable of refunding any extra parking credit paid by the user of each networked computerized parking meter 50 to the parking charge card. Thus, possible human-made mistakes are minimized and the user of the networked computerized parking system is able to use the parking fees paid on parking charge cards to the most efficient extent.

By using the networked computerized parking system, the central database computer server performs several tasks simultaneously. The central database computer server maintains status of each networked computerized parking meter 50 by:

(a) assuring that each networked computerized parking meter 50 is functioning properly;

(b) assuring that occupation of a parking space by a vehicle is upon payment of necessary parking fees;

(c) checking that each networked computerized parking meter 50 that is being utilized has been appropriately activated upon proper modes of payment; and (d) searching for any networked computerized parking meters 50 that are functioning improperly, e.g. being out of order.

The central database computer server also updates and maintains information for each networked computerized parking meter 50 by updating and maintaining:

(a) a unique identification number for each networked computerized parking meter 50;

(b) a geographical location for each networked computerized parking meter 50, said geographical location including longitudinal geographical data and latitudinal geographical data and street address;

(c) a parking rate for each networked computerized parking meter 50;

(d) the maximum amount of parking time that is allowed for each networked computerized parking meter 50; and (e) a last date of service for each networked computerized parking meter 50.

In addition, the central database computer server has an option of communicating credit account information with each networked computerized parking meter 50. For example, number of transactions in a current month, total transactions for a previous month, and data and time of last number of times that the locked openable door 18 has been opened can be easily determined by the central database computer server. Due to existing capabilities of the mother board 12 and of the central database computer 90, many more pieces of information may be stored and used in operating a networked computerized parking system.

By using a networked computerized parking system which is constantly being supervised centrally by a central database computer server, changes in the networked computerized parking system may be made more efficiently and easily, as well. For example, changes in parking rates can be simply and quickly performed by a central database computer server when compared to changes in existing parking systems which require thousands of manpower hours when parking supervisors have to go through hundreds of streets to change set rates of thousands of parking meters in a municipality. Such a saving in manpower hours is specifically realized since networked computerized parking meters 50 are connected via the number of fiber optic network connections 13 to a number of other networked computerized parking meters 50 and to the central database computer 90, allowing each central database computer server to have control over thousands of networked computerized parking meters 50 simultaneously. Thus, through the networked computerized parking system, a central database computer server can determine serving status of each networked computerized parking meter 50 in a certain network. Each networked computerized parking meter 50 can be individually located and identified, thus significantly minimizing manpower required to control occupancy rate of parking meters, turn over rate of parking meters, calculation of and registration of parking fees for parking meters and functionality of parking meters. Also, the networked computerized parking meters 50 create a system that is easy and efficient to operate, with officers and users saving money and time in locating illegal parking and available parking, respectively.

An additional option provided by said networked computerized parking system is a notification system ("Global Positioning System" or "GPS") for informing drivers of any available empty parking spots. If a driver is searching for a parking spot, the GPS could notify the driver of the location of the closest, available parking spot. Using the GPS, the driver would send a search request to a central database. The search request would contain the following information: the card holders pin number, the current location of the vehicle, the radial distance in which the driver is willing to search for a spot, the destination of the driver. The central database provides the best available parking spot. With the growing demand from the public, from State legislation and from federal legislation for reducing air pollution, it is more desirable that parking spots are delivered to drivers than drivers searching for parking spots. Application of said networked computerized parking system assists in reducing pollution, saving energy, and reducing traffic jams by helping drivers to decrease the time and distance driven around streets in search of parking spots.

Certain objects are set forth above and made apparent from any accompanying charts, tables, examples and drawings. However, since certain changes may be made in any accompanying charts, tables, examples and drawings without departing from the scope of the invention, it is intended that all matters contained in any accompanying charts, tables, examples and drawings shall be interpreted as illustrative only of the principles of the invention and not in a limiting sense. With respect to the above description and examples then, it is to be realized that any descriptions, charts, tables, examples and drawings deemed readily apparent and obvious to one skilled in the art and of equivalent relationships to those stated in the examples and described in the specification or illustrated in the drawings or shown in the charts or tables, are intended to be encompassed by the present invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention. It is also to be understood that the following claims are intended to cover all of the generic and specific features of the invention herein described, and all statements of the scope of the invention which, as a matter of language, might be said to fall therebetween.

What is claimed as invention is:

1. A networked computerized parking system of networked computerized parking meters connected via a number of electric-transferring cables to a local power source and connected via a number of fiber optic network connections to a number of other networked computerized parking meters and to a central database computer, with each networked computerized parking meter having a number of essential components comprising:

(a) a main body mounted on and connected to a base, said main body comprising a top, a front surface, and a tightly-fastened, removable back surface for facilitating service work, and said base comprising a bottom;

(b) a mother board, having a front and a back, positioned inside the main body, with the number of electric-transferring cables and the number of fiber optic network connections connected to the back of the mother board and leading downwards to exit from the bottom of the networked computerized parking meter and with a number of rechargeable batteries connected to the mother board as a supplementary power source;

(c) a motion detector, with a front placed on a section of the front surface of the networked computerized parking meter and with a back connected to a portion of the front of the mother board via motion detector cable, for detecting both arrival time and departure time of a vehicle;

(d) a liquid crystal display (LCD) screen located inside the networked computerized parking meter, with a front occupying a section of the front surface of the networked computerized parking meter and a back connected to a portion of the front of the mother board via ribbon cable, said LCD screen indicating information comprising any remaining, unused parking time, identification data related to any parking time card being used, parking rate and any amount of parking time allowed;

(e) a numeric code pad, with a front and a back, said front of the numeric code pad, comprising ten numeric buttons from "0" to "9", an "ENTER" button and a "CANCEL" button, said numeric code pad occupying a section of the front surface of the networked computerized parking meter, and said back of the numeric code pad connected via ribbon cable to a portion of the front of the mother board; and (f) a magnetic strip reader, with a back connected via ribbon cable to a portion of the front of the mother board and with a front, said magnetic strip reader being located in front of the mother board, being positioned inside the networked computerized parking meter, and having a card insertion opening extending from the front of the magnetic strip reader towards the front surface of the networked computerized parking meter and creating an opening for insertion of parking charge cards;

such that:

parking charge cards are charged for used parking time only, and the motion detector terminates use of the parking charge cards upon removal of the vehicle.

2. The networked computerized parking system according to claim 1, wherein the networked computerized parking meter has a number of optional components comprising: a timer, with a front covered by a transparent cover and a back, said timer being set in specified time intervals to indicate, in substitution for the LCD screen, any amount of parking time allowed or any remaining, unused parking time upon usage of a number of coins or upon usage of prepaid parking cards, respectively, and to indicate a "CPM" sign upon usage of parking account cards and credit cards, said timer extending from vicinity of the mother board to the front surface of the networked computerized parking meter and connected to a visible pointer pointing to any unused, remaining paid parking time and to a parking violation light, both the pointer and the parking violation light located on the front of the timer and on a section of the front surface of the networked computerized parking meter, with the back of said timer being connected via ribbon cable to the mother board.

3. The networked computerized parking system according to claim 1, wherein the networked computerized parking meter has a number of optional components comprising: a series of coin slots for accepting a number of coins including nickels, dimes, quarters and dollar coins, said series of coin slots being located adjacent to a coin verifier that is positioned inside the networked computerized parking meter, is connected to a portion of the front of the mother board via ribbon cable, and is located adjacent to and connected via a first coin path to an internal safe box, said safe box having a front covered by a locked openable door for removal of the deposited number of coins and for service work, having a back, being located below the coin verifier and towards the bottom of the networked computerized parking meter, being connected through an opening to the coin verifier, serving as an internal storage for the number of deposited coins and occupying a relatively large space in the networked computerized parking meter, such that the number of acceptable deposited coins, falls through the opening via the first coin path into the safe box.

4. The networked computerized parking system according to claim 3, wherein the networked computerized parking meter has a number of optional components comprising: a coin return opening being connected via a second coin path to the coin verifier and being located below the series of coin slots and below the coin verifier and above the safe box, and a coin twister being located close to said series of coin slots, such that upon placement of a number of coins in any coin slot in the series of coin slots and turning of the coin twister, the number of acceptable coins that is verified by the coin verifier fall via the first coin path through the opening into the safe box and a number of unacceptable coins and objects that are not verified by the coin verifier fall via the second coin path to the coin return opening.

5. The method of operating a networked computerized parking system of networked computerized parking meters individually controlled by a mother board placed inside each networked computerized parking meter and connected to a central database computer, each mother board determining parking rate for each parking space, unique identification of each networked computerized parking meter, comprising geographic location and unique identification number of each networked computerized parking meter, last date of service for each networked computerized parking meter, and parking status, parking rate and maximum amount of parking time of each networked computerized parking meter, said method comprising:

(a) parking a vehicle in a parking space in front of a networked computerized parking meter with a turned-on parking violation light;

(b) state of occupation of the parking space by the vehicle being constantly determined by a motion detector located on a front surface of the networked computerized parking meter, said motion detector, operated through the mother board, scanning in front of the networked computerized parking meter to locate the parked vehicle and notifying the central database computer of occupation of the parking space upon passage of a set period of time from locating of the parked vehicle;

(c) placing a parking charge card, comprising prepaid parking cards, parking credit account cards and credit cards, in a card insertion opening of a magnetic strip reader of the networked computerized parking meter, with information, comprising account information, being scanned off a magnetic strip on the parking charge card by the magnetic strip reader connected to the mother board in the networked computerized parking meter, with any scanned information being sent to the mother board and with some scanned information being sent to the central database computer;

(d) pressing a personal identification number on a numeric code pad connected to the mother board to obtain credit on the parking charge card and entering any correct personal identification number by pressing an "ENTER" button on the numeric code pad while correcting any errors in entrance of the personal identification number that may show on a liquid crystal display (LCD) screen connected to the mother board by pressing a "CANCEL" button, said personal identification number being transferred to the mother board and checked through the central database computer;

(e) upon verification of the personal identification number and any information read off the magnetic strip of the parking charge card through the central database computer, a timer being commenced if the networked computerized parking meter functions properly and the parking violation light being automatically turned off, said timer used for starting a requested parking time allowance upon noting parking payment rate and maximum parking time allowed by:

A. upon usage of a prepaid parking card, subtracting the requested parking time allowance, using the magnetic strip reader, from a parking time allowance of the prepaid parking card and indicating the unused, remaining parking time allowance on the prepaid parking card, as long as:

(i) the requested parking time allowance is at most equal to the maximum parking time allowed on the timer by the central database computer, and (ii) the requested parking time allowance is at most equal to the parking time allowance of the prepaid parking card, with the parking time allowance lowering automatically in set time intervals until a "zero" position is reached by a pointer on the timer or on the LCD screen, or B. upon usage of a credit card, including but not limited to a credit card and a parking credit account card, for which bills are received periodically:

(i) on the LCD screen, adding up total parking time being used while indicating "Computerized Parking Meter" ("CPM"), or on the timer, starting the timer while moving the pointer to the "CPM" position, (ii) continuing to add up used parking time as long as sum of the used parking time does not exceed the maximum parking time allowed for said parking space by the central database computer, (iii) lowering the parking time allowance to the "zero" position upon reinsertion of the credit card, entrance of a cancellation request on the numeric code pad by the user, and removal of the credit card, and (iv) crediting any unused, remaining parking fee to the credit card upon entrance of the cancellation request, and with the information visible on the LCD screen disappearing after a few seconds until any button on the numeric code pad is pressed; and (f) turning on the parking violation light on the front surface of the networked computerized parking meter upon reaching of the "zero" position by the pointer of the timer or on the LCD screen, notifying the central database computer as well as any passing police officers of a parking violation if the vehicle remains parked for a period longer than a few minutes, and continuing to charge parking credit account cards or credit cards as long as the vehicle remains parked.

6. The method of operating the networked computerized parking system according to claim 5, wherein, when using a parking credit account card, the networked computerized parking system credits any unused, remaining parking fee to the parking credit account card and automatically lowers the parking time allowance to the "zero" position, turning on the parking violation light, upon removal of the parked vehicle and termination of use of the parking space indicated to the mother board by removal of the parked vehicle.

7. The method of operating the networked computerized parking system according to claim 5, wherein the parking violation light on the front surface of the networked computerized parking meter is turned on upon reaching of the "zero" position by the pointer of the timer or on the LCD screen with or without detection of the parked vehicle in front of the networked computerized parking meter by the motion detector.

8. The method of operating the networked computerized parking system according to claim 5, wherein, when a maximum amount of parking time that is allowed by authorities is reached, if the parking charge card is inserted into the card insertion opening of any networked computerized parking meter that is connected to the same central database computer from which parking time allowance has been purchased, the networked computerized parking system credits any unused requested parking fee to each parking charge card from which the parking time allowance has been originally deducted and returns the pointer of the timer of the networked computerized parking meter to the "zero" position or returns the timer of the LCD screen to the "zero" position.

9. The method of operating the networked computerized parking system according to claim 5, wherein the method can be used for parking boats, ships, or small planes.

10. The method of operating the networked computerized parking system according to claim 5, wherein the central database computer maintains status of each networked computerized parking meter by:

(a) assuring that each networked computerized parking meter is functioning properly;

(b) assuring that occupation of a parking space by the vehicle is upon payment of necessary parking fees;

(c) checking that each networked computerized parking meter that is being utilized has been appropriately activated upon proper modes of payment; and (d) searching for any networked computerized parking meters that are functioning improperly.

11. The method of operating the networked computerized parking system according to claim 5, wherein rates and states of parking for networked computerized parking meters are changed through the central database computer without requiring physical changes to the networked computerized parking meters.

12. The method of operating the networked computerized parking system according to claim 5, wherein users could be notified of any empty parking spots close to where each user is searching for parking, using a Global Positioning System (GPS) through the central database computer upon sending a search request to the central database computer, said search request comprising parking credit account card's pin number of the user, current location of the vehicle, radial distance willing to search for parking by the user, and destination of the user.

13. The method of operating the networked computerized parking system according to claim 5, wherein the method comprises:

(a) placing a number of coins in any coin slot of a series of coin slots for accepting a number of coins including nickels, dimes, quarters and dollar coins;

(b) having said number of coins be verified by using a coin verifier located inside the networked computerized parking meter, neighboring said series of coin slots, and connected to a portion of the front of the mother board via ribbon cable;

(c) upon verification of the number of coins by the coin verifier, the number of acceptable coins providing a set parking time allowance on the timer of the networked computerized parking meter or on the LCD screen and being dropped, as long as no other coin or object is stuck in a first coin path connecting the coin verifier to the safe box, through an opening connected to and into an internal safe box serving as an internal storage for the number of deposited acceptable coins as long as empty space remains in the safe box;

(d) indicating a decrease in the parking time allowance and any remaining purchased parking time on the timer or on the LCD screen until the "zero" position is reached;

(e) by turning on of the parking violation light on the front surface of the networked computerized parking meter upon reaching of the "zero" position, notifying officers responsible for issuing parking tickets of termination of the parking time allowance upon presence of the parked vehicle in front of the networked computerized parking meter when the "zero" position is reached; and (f) emptying the safe box of the networked computerized parking meter when the safe box is full and adding up the value of the number of acceptable coins by a responsible supervisor.

14. The method of operating the networked computerized parking system according to claim 13, wherein the method comprises: turning a coin twister located close to said series of coin slots after placement of a number of coins in any coin slot of the series of coin slots, such that upon turning of the coin twister and verification of the number of coins by the coin verifier, the number of unacceptable coins is dropped out through a coin return opening while the number of acceptable coins gives a set parking time allowance on the timer or on the LCD screen of the networked computerized parking meter and is dropped through the opening connected to and into the internal safe box serving as the internal storage for the number of deposited acceptable coins.

* * * * *